Patented Mar. 9, 1926.

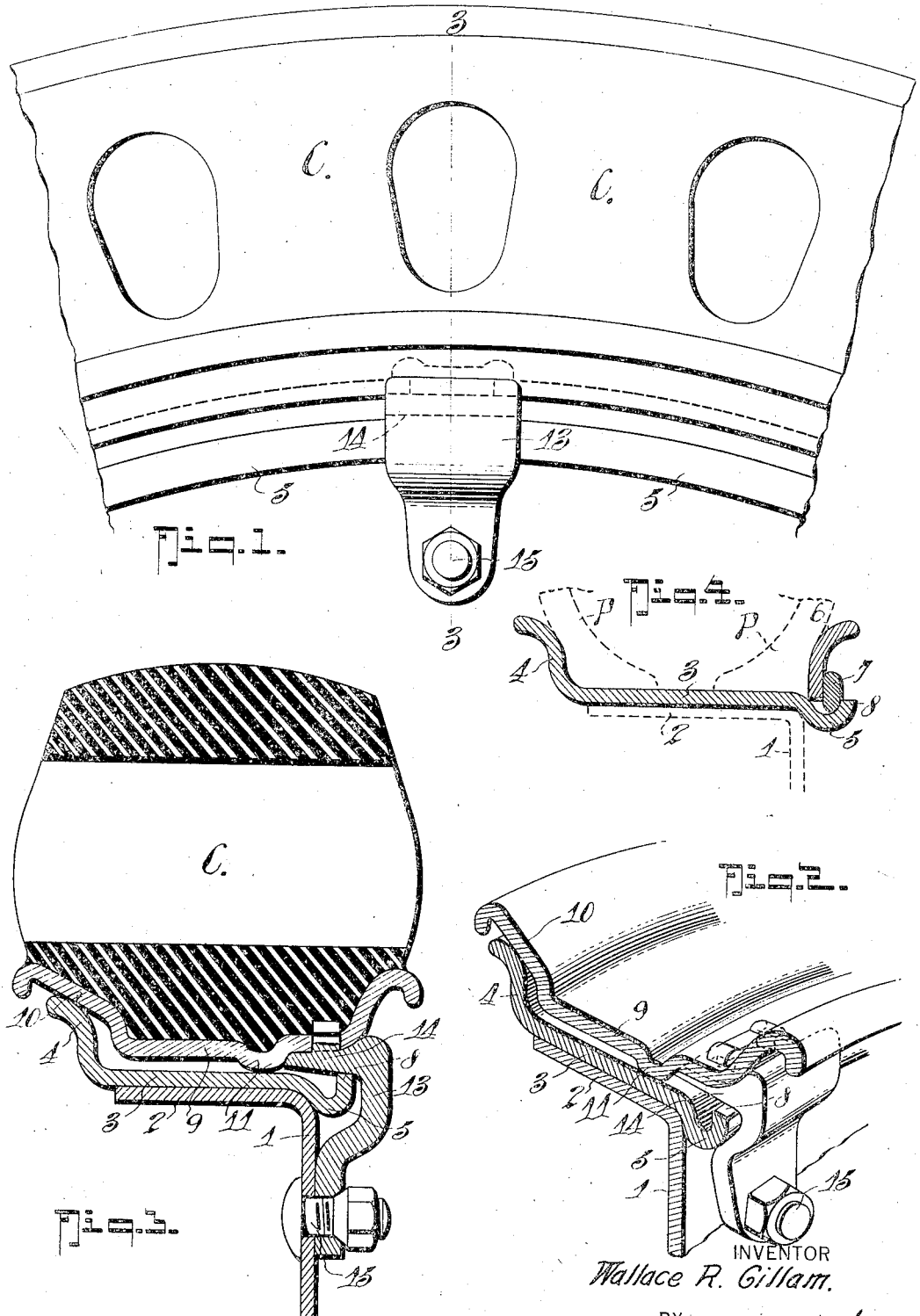

1,576,044

UNITED STATES PATENT OFFICE.

WALLACE R. GILLAM, OF TALLMADGE, OHIO, ASSIGNOR TO LAMBERT TIRE & RUBBER CO., OF BARBERTON, OHIO, A CORPORATION OF ARIZONA.

MEANS FOR ADAPTING WIDE-BASE CUSHION TIRES TO NARROW-BASE RIMS.

Application filed February 27, 1925. Serial No. 12,119.

*To all whom it may concern:*

Be it known that I, WALLACE R. GILLAM, a citizen of the United States, residing at Tallmadge, in the county of Summit and State of Ohio, have invented a new and Improved Means for Adapting Wide-Base Cushion Tires to Narrow-Base Rims, of which the following is a specification.

My invention has for its object to provide means by which preferably wide base cushion tires may be mounted on standard narrow base rims without the necessity of removing the standard rim from the wheel; more particularly the invention has for its object to provide means whereby a cushion tire that is molded permanently on a rim can be used in replacement of pneumatic tires on standard rims of the well known Budd-Michelin type, where the standard rim is a fixture with the wheel or is a part of the wheel itself, thus enabling cushion tire equipment to replace pneumatic tire equipment at a low cost and with a minimum expenditure of time and labor.

My invention has been especially designed with a view of replacing pneumatic tire equipment in taxi cab service, with cushion tires of wide base and greater carrying capacity.

More subordinately, the invention resides in those novel features of construction, combination and arrangement of parts all of which will be first fully described, then be pointed out in the appended claims and illustrated in the accompanying drawing, in which:—

Figure 1 is a side elevation illustrating the application of my invention.

Figure 2 is a detail sectional perspective of a Budd-Michelin disk wheel and rim with my invention applied, the cushion tire being omitted.

Figure 3 is a cross section on the line 3—3 of Figure 1.

Figure 4 is a detail section on a small scale showing the standard Budd-Michelin rim and wheel as at present used with pneumatic tires.

In the drawing I have shown in Figure 4 a cross section for the purpose of defining the structure which I have referred to as the Budd-Michelin type and which it is the purpose of my present invention to adapt for use with cushion tires.

In the drawing, 1 designates a standard type of steel disk wheel (Budd) on the periphery of which a standard rim 3 for demountable pneumatic tires is located under the present practice, the rim 3 being usually permanently secured by rivets or welding to the periphery of the wheel.

The standard rim (Michelin), as shown in Figure 4, consists of a base 3 secured to the periphery 2 of the wheel 1 and having a flange 4 at one side to engage one side of the pneumatic tire P, and having a depression or groove 5 at the other side, hook shape in cross section, to receive the locking ring 7 that holds the removable side ring 6 in place.

In adapting the standard Budd-Michelin wheel to use with cushion tires I discard the rings 6 and 7 entirely and provide the cushion tire C with a special rim having a base 9 and an upwardly and outwardly inclined side portion 10 to lie on the outwardly curved edge of the flange 4 of the standard rim 3. The special rim 9 also has a depression 11 which is adapted to lie normally almost in contact with the base 3.

In order to hold the rim 9 in place tightly, I provide lugs 13 having a wedge portion 14 to ride on the edge 8 of the contact portion 5 of the standard rim 3, the lugs 8 being adapted to be drawn over and secured to the wheel 1 by bolt and nut devices 15 held in holes drilled therefor in the wheel 1.

Should the lugs 13 not be drawn up tight enough or should they work loose slightly the rim of the cushion tire will ride on its projections 11 at one side and on the surface 10 at the other, and take the weight off the lugs 15.

From the foregoing it will be seen that I have provided a simple and effective means for adapting the standard Budd-Michelin wheels to use cushion tires, without the necessity of providing the wheels with new felly bands or rim portions and without the necessity of the application of expensive labor.

From the foregoing description, taken in connection with the accompanying drawing, it is thought the complete construction and advantages of my invention will be readily apparent to those skilled in the art.

What I claim is:

1. A means for adapting cushion tires to standard rims of the quick detachable type, which rims comprise a base with one side flange and a locking ring groove at the opposite side; said means comprising a special rim which is adapted permanently to carry a cushion tire, said special rim comprising a base and two side flanges, one of which is adapted to rest on the side flange of the standard base, securing wedge lugs fastened to said special rim and adapted to lie between the base of the special rim and over the locking-groove-edge of the standard rim, said wedge lugs each having a portion projecting radially, and fastening bolt and nut devices to hold said lugs in place, thereby to secure said rims together.

2. In combination, a standard rim comprising an annular base having an outwardly projected flange at one side and an inwardly projected groove at the other side, and a special rim of wider dimension and greater diameter than the standard rim, said special rim comprising an annular base having outwardly projected flanges, one of which includes an inclined contacting part to engage the outwardly projected flange of the standard rim, wedge lugs inserted between said rims at the side adjacent the inwardly projected groove and means to secure said lugs in place and tighten said rims together.

3. In combination, a disk wheel carrying a standard rim comprising an annular base having an outwardly projected flange at one side and an inwardly projected groove at the other side, and a special rim of wider dimension and greater diameter than the standard rim, said special rim comprising an annular base having outwardly projected flanges, one of which includes an inclined contacting part to engage the outwardly projecting flange of the standard rim, wedge lugs inserted between said rims at the side adjacent the inwardly projected groove, means to secure said lugs in place and tighten said rims together, said lugs being permanently secured to said special rim and detachably securable by said securing means to said wheel.

WALLACE R. GILLAM.